Oct. 3, 1933.  D. A. SILLERS  1,928,706
MIST EXTRACTOR
Filed April 11, 1930
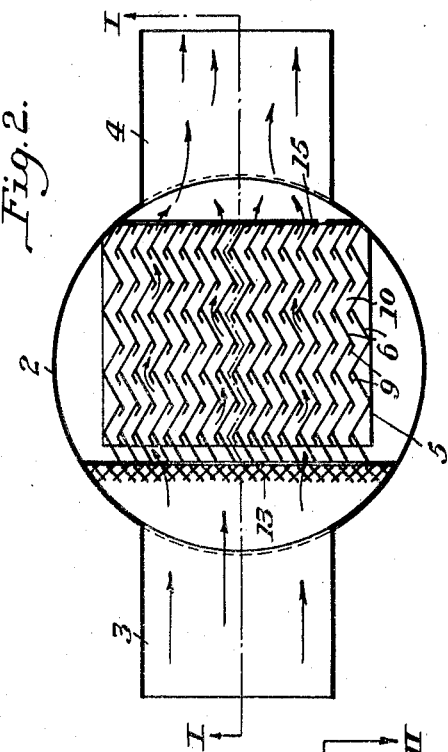
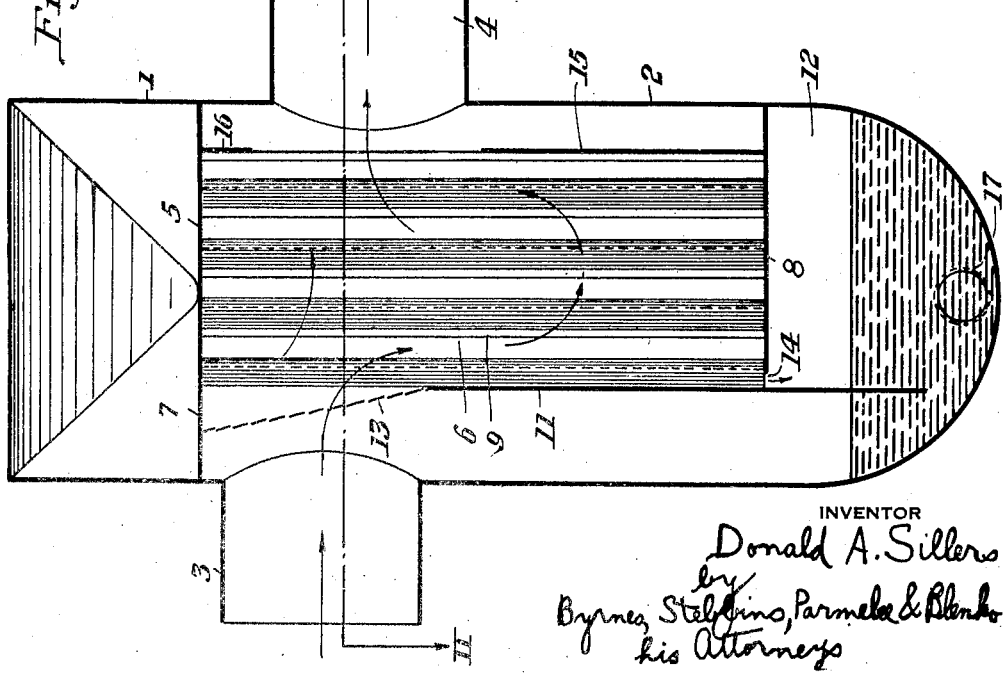
INVENTOR
Donald A. Sillers
by
Byrnes, Stebbins, Parmelee & Blenko
his Attorneys Patented Oct. 3, 1933

1,928,706

UNITED STATES PATENT OFFICE 1,928,706

MIST EXTRACTOR

Donald A. Sillers, Dallas, Tex.

Application April 11, 1930. Serial No. 443,407

3 Claims. (Cl. 183—113)

My invention relates to mist extractors, and more particularly to a device for separating oil or water from gas.

Natural gas wells produce a very small amount of oil or gasoline and in many cases considerable quantities of water. Also in gasoline plants and refineries, due to the various processes involved, a certain amount of oil, gasoline or water is carried over with the gases.

I provide means whereby the undesirable water, oil or gasoline may be separated from the gas while the latter is being conducted through a conventional pipe line.

One embodiment of my invention is illustrated in the accompanying drawing in which:

Figure 1 is a vertical sectional view of a mist extractor;

Figure 2 is a horizontal sectional view taken on the line II—II of Figure 1.

Referring to Figures 1 and 2, a mist extractor 1 is illustrated consisting of a vertical cylindrical chamber 2 that is provided with horizontally offset inlet and outlet couplings 3 and 4 respectively for connection with a gas pipe line (not shown). Mounted within the chamber 2 is a mist extractor unit 5 consisting of a plurality of vertical zig-zag plates 6 that are retained in position by means of upper and lower end plates 7 and 8. The vertical zig-zag plates 6 are provided with extensions 9 forming pockets at the corners for entrapping liquid collected by the vertical plates 6.

The bottom plate 8 of the mist extractor unit 5 is elevated above the bottom of the chamber 2 to provide a reservoir for the liquid that is separated from the gas passing through the device. A front baffle plate 11 is mounted on the unit 5 in such manner that its lower portion extends into the reservoir 12 at the bottom of the chamber 2. The opening above the front plate 11 is filled with a vertically inclined screen 13 for protecting the plates 6 from injury due to large particles carried by the gas.

An opening 14 is provided in the front part of the lower end plate 8 for permitting liquid to flow from the extractor unit 5 into the reservoir 12.

Spaced vertical back plates 15 and 16 complete the extractor unit. The space or opening between the plates 15 and 16 permits the clean or liquid-free gas to be discharged through the outlet coupling 4.

The mist extractor 1 is installed directly in a gas main and the gas entering the inlet coupling 3 passes first through the heavy screen 13, which prevents large particles from entering the extractor unit 5 and injuring the zig-zag separating plates 6. The gas is forced to take a downwardly extending path through the unit 5 because of the lower position of the outlet coupling 4. The gas is forced to take the zig-zag path of the openings 10 and the liquid is separated from the lighter gas by the action of the mixture being wiped against the wet surfaces of the zig-zag plates. The separated liquid is deposited on said plates and is entrapped in the pockets formed by the extensions 9, where it immediately flows downwardly to the bottom of the unit 5 through opening 14 and into the reservoir 12. The lower portion of the front baffle 11 extends down into the reservoir 12 and prevents the incoming gas from entering the opening 14 and traveling in an upward direction through the separating unit 5 toward the outlet coupling 4.

A suitable opening 17 is provided in the bottom of the chamber 2 for drawing liquid from the reservoir 12, the opening or tap 17 may, of course, be provided with any suitable valve or automatic trap device.

The zig-zag passageways cause the gas to be thrown first against one side and then the other thereof, causing the mist to liquefy on the surfaces of the passageways. The pockets assist this action by setting up a turbulent motion in the gas, thereby assuring that all of the gas is "wiped" over at least a portion of the zig-zag plates. This efficiently separates all liquid from the gas. The pockets also quickly entrap and then remove the liquid from the sides of the passageways and from the path of the gas.

It is to be noted that I provide a mist extractor of unit construction that is preferably permanently associated with a gas pipe line. The mist extractor is an individual and complete unit in itself and need only be connected with the pipe line to give the desired result.

While I have illustrated and described preferred embodiments of my invention, it will be understood that it is not thus limited but may be otherwise embodied within the scope of the following claims.

I claim:

1. Apparatus for extracting liquid from gas, comprising a casing for insertion in a gas pipe line having an inlet opening and an outlet opening below the inlet openings, the bottom of the casing forming a liquid reservoir, a plurality of vertical plates arranged to form angular zig-zag passages for the gas as it passes from the inlet opening to the outlet opening, a screen positioned between the inlet opening and the plates and slanted for the purpose of deflecting intercepted matter downwardly to the reservoir at the bottom of the casing, and a baffle extending from said screen into the liquid in the reservoir for causing the gas to flow through said screen and away from the liquid in the reservoir.

2. Apparatus for extracting liquid from gas, comprising a casing for insertion in a gas pipe line having an inlet opening and an outlet opening below the inlet opening, the bottom of the casing forming a liquid reservoir, a plurality of vertical plates arranged to form angular zig-zag passages for the gas as it passes from the inlet opening to the outlet opening, vertical channels positioned on the outside angles formed by said plates and facing into the path of the gas for conducting extracted liquid downwardly to the reservoir and out of the path of the gas, a screen positioned between the inlet opening and the plates and slanted for the purpose of deflecting intercepted matter downwardly to the reservoir at the bottom of the casing, and a baffle extending from said screen into the liquid in the reservoir for causing the gas to flow through said screen and away from the liquid in the reservoir.

3. Apparatus for extracting liquids from gas comprising a casing having an inlet and an outlet opening, the bottom of the casing forming a liquid reservoir, a plurality of vertical plates arranged to form zig-zag passages for the gas as it travels from the inlet opening to the outlet opening, perforate means between the inlet opening and the plates, said means being inclined to the direction of flow of the gas, and a baffle extending from the bottom of said perforate means into the liquid of the reservoir for preventing the gas from by-passing said perforate means.

DONALD A. SILLERS.